United States Patent [19]

Boniello et al.

[11] Patent Number: 4,867,992

[45] Date of Patent: Sep. 19, 1989

[54] NATURAL COFFEE FLAVOR BY FERMENTATION

[75] Inventors: Barbara Boniello, Orange Park, Fla.; Ernest Gum Jr., Carmel, N.Y.; Richard Scarpellino, Ramsey, N.J.; Barbara Doonan, Mt. Vernon, N.Y.; John Patterson, Harrisonburg, Va.; Geoffrey Bertkau, Brewster, N.Y.

[73] Assignee: General Foods Corporation, White Plains, N.Y.

[21] Appl. No.: 168,829

[22] Filed: Mar. 16, 1988

Related U.S. Application Data

[63] Continuation-in-part of Ser. No. 25,918, Mar. 16, 1987, abandoned, which is a continuation-in-part of Ser. No. 623,304, Jun. 22, 1984, abandoned.

[51] Int. Cl.$^4$ ................................................. A23F 5/46
[52] U.S. Cl. ....................................... 426/45; 426/52; 426/61; 426/629; 426/650
[58] Field of Search ................... 426/45, 7, 52, 61, 62, 426/44, 629, 650

[56] References Cited

U.S. PATENT DOCUMENTS 4,304,862 12/1981 Troller .................................. 426/34

OTHER PUBLICATIONS

"Biosynthesis of Flavor Compounds by Microorganisms" Collins, E. B., 1972, Journal of Dairy Science, vol. 55, No. 7, pp. 1022-1028.

Primary Examiner—Marianne Cintins
Attorney, Agent, or Firm—Thomas A. Marcoux; Thomas R. Savoie; Daniel J. Donovan

[57] ABSTRACT

A buttery and/or winey flavor of which diacetyl and acetoin are the major flavor constituents is produced by the fermentation of a coffee substrate. The process involves forming a nutrient media containing water and soluble coffee solids as the nutrient component, the soluble solids concentration being at least 0.5%. A microorganism which is either a strain of lactic acid producing bacteria or yeast capable of producing diacetyl is added the nutrient media and the combination is mixed and simultaneously placed into an environment of a pH of from 4.0 to 7.0, a temperature of from 16° to 37° C., for a period of time effective to produce diacetyl and aeration conditions wherein the nutrient media contains sufficient oxygen to allow for diacetyl production. The aforementioned process will produce diacetyl and acetoin. The diacetyl which is produced is recovered and or concentrated and added to a coffee product.

36 Claims, No Drawings

NATURAL COFFEE FLAVOR BY FERMENTATION

This application is a continuation-in-part of our prior copending application Ser. No. 025,918 filed on Mar. 16, 1987, now abandoned which in turn is a continuation-in-part of application Ser. No. 623,304 filed June 22, 1984 which is now abandoned.

FIELD OF THE INVENTION

The present invention is related to the field of the flavoring of food products, specifically the addition of a natural flavor formed by fermentation. The invention involves the production of a natural buttery and/or winey flavor of which diacetyl and acetoin are the major flavor constituents from the fermentation of a coffee substrate by a strain of lactic acid producing bacteria or yeast capable of producing diacetyl. The fermented coffee material which has a buttery, winey flavor, may be added directly to the green coffee to be processed therewith, or the flavor may be distilled or concentrated and added to a soluble coffee product or a roast and ground coffee product.

BACKGROUND ART

Food technologists have over the years strived to develop synthetic or natural flavors which would either impart a coffee-like flavor to an imitation beverage or a flavor which would augment a particular flavor note in a natural coffee product in which the flavor note was deficient. A compound in coffee which imparts a butter flavor and aroma is the compound diacetyl (2, 3-butanedione). This compound is a yellow liquid having an extremely potent butter aroma. Diacetyl can be formed either by chemical synthesis or by bacterial fermentation. Diacetyl as a flavorant is particularly important in dairy products such as sour cream, and cultured butter and butter milk. Also it is important in such non-dairy products as butterscotch, honey, coffee, maple syrup, white bread, summer sausage, and margarine.

U.S. Pat. No. 4,304,862, issued to Troller entitled "Method for Increasing the Diacetyl Production of a Diacetyl-Producing Bacteria" teaches a method wherein the increased diacetyl production is attributable to a set of specific conditions including a nutrient medium having a pH of from about 4.5 to 7, incorporation of a humectant to lower the $a_w$ value of the nutrient medium to about 0.95 to 0.99 and a temperature for incubation of from about 28° to 37° C. The patent also teaches incorporating a metabolizable amount of a diacetyl precursor which is citric acid or an acceptable salt thereof. An article written by Collins in The Journal of Dairy Science entitled "Biosynthesis of Flavor Compounds by Microorganisms" teaches that the enhancement of diacetyl production requires a strain of bacteria or yeast able to produce diacetyl, and the control of the environment such as to achieve good growth of the selected organism. Specifically the environment includes a pH below about 5.5 and an oxygen containing environment.

While diacetyl has been known as an important flavor ingredient of dairy and coffee products, fermentation produced by bacteria or yeast on a coffee substrate to produce a natural diacetyl has not heretofore been demonstrated. It is an object of the present invention to produce diacetyl by microbial fermentation of pure coffee materials to produce a buttery flavor directly from a coffee substrate.

DISCLOSURE OF THE INVENTION

The present invention is a method for producing a natural buttery and/or winey flavor of which diacetyl and acetoin are the major flavor constituents from a coffee substrate. The process involves forming a nutrient media containing water and soluble coffee solids as the sole nutrient component, that is the component which promotes the growth and development as well as acts as the raw materials from which new protoplasm can be synthesized, the soluble solids concentration being at least 0.5%. A microorganism which is either a strain of lactic acid producing bacteria or yeast capable of producing diacetyl, preferably a lactic acid producing bacteria is added the nutrient media and the combination microorganism and nutrient media is gently mixed in order to bring into the nutrient media a certain amount of air and simultaneously placed into an environment of a pH of from 4.0 to 7.0, a temperature of from 16° to 37° C., for a period of time effective to produce diacetyl and aeration conditions wherein the coffee substrate composition contains sufficient oxygen to allow for diacetyl production. The aforementioned process will produce an amount of diacetyl up to 2000 parts per million (ppm) and variable amounts of acetoin depending upon the time of fermentation.

As a result of the process of the present invention, a buttery and/or winey flavor is produced naturally from pure coffee material and as a result if the flavorant is added to a coffee beverage the combination can be termed "all coffee". Addition of the natural flavoring produced according to the present invention will provide a smoother, "buttery" and more mellow brew.

BEST MODE FOR CARRYING OUT THE INVENTION

The present invention resides in a process for producing a natural buttery and/or winey flavor consisting primarily of diacetyl and acetoin which are produced from a coffee substrate. The microorganism which is utilized to ferment or "bioconvert" the coffee substrate to produce the natural flavor include any strain of lactic acid producing bacteria or yeast capable of producing diacetyl, preferably a lactic acid producing bacteria. Suitable lactic acid producing bacteria include the families Lactobacillaceae, Streptococcaceae, and also certain species of Micrococcus which generate lactic acid. Preferred bacteria for carrying out the present invention include pure cultures or mixtures of strains of the following species: *Lactobacillus casei, Streptococcus diacetvlactis, Leuconostoe citrovorum, Streptococcus cremoris, Streptococcus faecalis,* and *Lactobacillus xylosus,* for the reason that both growth and diacetyl production occurs on coffee substances.

Suitable coffee substrates employed in the present invention as part of or all of the all-coffee nutrient media include soluble solids from green extract (aqueous green coffee solids) ground green coffee beans, coffee by products (pulp, coffee husks and mucilage), as well as hydrolyzed spent grounds, roast and ground coffee and brown extract. The preferred substrate concentration will vary from 0.75% to 25% soluble solids concentration. Too high a concentration of coffee solids will create an osmotic problem causing cells to loose water to the nutrient media. Soluble coffee solids as defined in the present invention shall include extractable coffee solids. Of the above listed coffee substrates, green extract containing the above-identified concentration of soluble green coffee solids is the preferred coffee substrate. In a preferred mode, the nutrient media is made up exclusively of soluble coffee solids alone or in combination with pyruvate.

The microorganisms which have been added to the nutrient media containing soluble coffee solids are placed into an environment in which the conditions of pH, temperature, time and aeration conditions must be kept within certain defined limits. The pH of the bacteria or yeast and coffee substrate combination must fall within the range of 4.0 to 7.0. The temperature should be between 16° to 37° C., preferably from 27° to 32° C. The bacteria or yeast should ferment in contact with the coffee substrate composition for a period of time effective to produce diacetyl, preferably from 8 to 96 hours.

Aeration is an important part of the bioconversion in that oxygen stimulates diacetyl production. Literature states that oxygen plays a role in diacetyl production by reducing the amount of pyruvic acid which must be converted to lactic acid for NADH. Oxygen also influences the formation of diacetyl by influencing the formation of acetyl CoA. As is apparent to those knowledgeable in the art of biochemistry, the oxidation of 1 mole of glucose produces 2 moles of pyruvic acid, and 2 moles of NAD+ are reduced (Glycolysis). The supply of AND+ is limited, and the reduced NAD+ must be reoxidized so that the oxidation of glucose may continue. Pyruvate, produced via glycolysis, is used as a proton acceptor (electron donor) and is reduced to lactic acid. In the presence of oxygen, NADH oxidase is stimulated to produce NAD+, and this lowers the metabolic demand of its production via pyruvate reduction.

The biosynthesis of diacetyl also requires acetyl CoA. Lipoic acid is involved in the formation of acetyl CoA from hydroxyethyl-TPP and Coenzyme A (pyruvate dehydrogenase complex). In this mechanism, the lipoic acid is reduced; NAD+ is necessary for reoxidation of lipoic acid and in turn is itself reduced. NADH oxidase, whose enzyme activity is stimulated by oxygen (aeration), is involved in the reoxidation of NAD+.

An optional minor ingredient which may be added to the nutrient media is a diacetyl precursor or enhancer, preferably pyruvic acid or bacteriologically acceptable salts of pyruvic acid which is added at a level of from about 0.1% to 1.0%, preferably from 0.5% to 0.8% by weight of the nutrient media. The pyruvate will function to increase the amount of diacetyl produced by two to ten fold. The pyruvic acid which is added may be either naturally produced or synthetically produced. Most preferably the pyruvic acid is a natural, coffee-derived ingredient thereby allowing the diacetyl so produced to be termed a natural additive produced from an "all coffee" source.

The conditions to which the bacteria are subjected are not conditions optimal to its continued growth and reproduction. At the conditions specified above, the organism is not metabolizing efficiently. The bacteria will, however, thrive on nutrient media anaerobically at a temperature of approximately 37° C. and a pH of 6.5.

A continuous or semi-continuous process for producing diacetyl from a coffee substrate may also be accomplished by the present invention. This type of process would necessitate the use of an immobilized bacteria or high substrate concentration. One of several different methods can be utilized to accomplish the immobilization of one or more of the diacetyl producing strains of lactic acid bacteria. These include encapsulation, attachment to a solid support, isolation utilizing a membrane with a pore size smaller than the bacteria or other means readily apparent to those skilled in the art. For further discussion on the use of immobilized cells, attention is directed to the article entitled "Application of Microbial Enzymes for Production of Food-Related Products" by Weetal and Zelko.

In such a continuous or semi-continuous system it may be desirable to subject the immobilized cells of the bacteria to conditions optimal for diacetyl production and then alternatively to a different set of conditions which are optimal for bacterial growth (approximately 37° C., anaerobic environment and pH of 6.5). During optimal bacterial growth it may be desirable to utilize conventional nutrient media as the growth substrate since it will provide for faster bacterial growth.

An alternative method for continuous or semicontinuous production of diacetyl is to use the pH, temperature and aerations conditions described previously, but also provide a regulated flow of soluble green coffee solids at a 7.25% concentration. The system when operated under these parameters produces both diacetyl and slow growth of the bacteria. The flow is matched to the slow growth rate of the bacteria under the above conditions. Although less efficient in producing diacetyl from soluble solid on a weight per weight basis, this system has overall process advantages if the fermented solids can be returned to the coffee product.

After the effective period of time, an amount of diacetyl is produced according to the process of up to 2000 parts per million where pyruvate is added and at levels approximately 200 parts per million without the additional pyruvate or other diacetyl precursor. An amount of acetoin is also produced at levels which may be smaller or larger than the amount of diacetyl depending upon the length of fermentation time. The solution containing the diacetyl, acetoin, coffee substrate and bacteria could be added as is to green coffee, roast and ground coffee, or to brown extract. Preferably, however, the diacetyl and/or acetoin which is produced is isolated from the other compounds present by distillation according to known means. The diacetyl will be incorporated into a coffee product or an imitation coffee-type product at a level of from 0.1 to 1.5 parts per million on an as-consumed basis.

The utilization of this invention has application to soluble coffee processing. After the diacetyl is recovered and concentrated, it may be added at any convenient step in the soluble coffee process such as plating the dry soluble coffee or coffee substitute with a desired dilution of the flavor agent in an acceptable solution followed by drying. In certain instances the diacetyl may be added either in solution with the coffee substrate and bacteria or it may be isolated and then added directly to a concentrated coffee extract and the mixture spray dried or freeze dried into a soluble coffee product which contains the diacetyl as an intrinsic part thereof. The diacetyl is added to a soluble coffee product at a level of from 10 to 150 ppm diacetyl on a dry weight basis.

The diacetyl may also be added to roast and ground coffee to augment a buttery flavor note. The diacetyl can be added to roast and ground coffee at a level of from 50 to 400 ppm on a dry weight basis. The roast and ground coffee containing the added diacetyl when brewed will produce a coffee containing the aforementioned level of diacetyl on an as-consumed basis.

The invention will be further described with reference to the following examples which are given for illustrative purposes only.

EXAMPLE 1

A natural buttery coffee flavor was produced utilizing a whole green bean extract and separately from a ground green bean extract.

Whole green beans, in a ratio of 20% bean/80% water (wt/wt) were extracted using an overhead stirer as follows: beans were extracted for 2 hours at 60° C. after which the temperature was increased to 77° C. (1 hour) and held at 77° C. for 2 hours. The extract was expressed through cheese cloth and concentrated to about 12% solids by rotoevaporation at 50° C. The concentrated extract was then autoclaved ($\sim$15 min@120 psi). Prior to innoculation with $L.$ $casei$ 393, pyruvic acid was added (0.75% and the pH adjusted to 5.67. The mixture was innoculated (with approximately from $10^7$ to $10^8$ cells per ml) viable cells of $L.$ $casei$ and held at 28° to 29° C. Diacetyl levels of over 1000 ppm were obtained in 48 hours.

Green beans were ground in a Retsch mill. The procedure used above was followed with the addition that, after autoclaving, the extract was centrifuged for 20 minutes at 6000 rpm. Over 300 ppm diacetyl was obtained without the addition of pyruvic acid under similar conditions after 72 hours at 28° C. temperature.

EXAMPLE 2

Diacetyl levels of 225 ppm were produced by $Lactobacillus$ $Casei$ ATCC No. 393 bacteria after a 72 hour batch fermentation in a 2-liter bioreactor operated under aerobic conditions. An aeration rate of 0.1 volumes air/volumes broth per minute (VVM) maintained nearly saturated oxygen conditions. The temperature was maintained at 27° C. throughout the course of the run. Fermentation broth consisted of an all-coffee 10% soluble solids extract (green soluble coffee solid)) inoculated with $10^7$ cells/ml. Cell counts reached $10^9$ cells/ml after the same period of time while the pH decreased from an initial value of 5.2 to 4.3.

An identical bioreactor maintained under strictly anaerobic conditions by sparging nitrogen gas at a rate of 0.1 VVM through the fermentation broth produced less than 30 ppm diacetyl.

Despite the difference in diacetyl levels, cell growth and pH as a function of time were identical to the aerobic bioreactor thus indicating the importance of oxygen for diacetyl production.

EXAMPLE 3

A natural buttery coffee flavor was produced in an airtight 500 ml flask, utilizing a sterile 1% solution containing 2.5 grams of soluble green coffee solids. The solution was then inoculated with $2.5 \times 10^{10}$ cells of $Lactobacillius$ $casei$ (ATCC No. 393) and placed in a shaker to agitate slowly (60 rpm at room temperature (23° C.)) at a pH of 5.4. After 50 hours, the culture contained 60 ppm diacetyl. Even though the flask was airtight, sufficient oxygen for diacetyl production was present in the headspace because the volume of headspace was large compared to the volume of inoculum and nutrient media. Also samples were withdrawn two to three times a day allowing for some aeration. Greater aeration would have increased the yield of diacetyl significantly.

The culture containing diacetyl was then removed from the shaker and distilled at 100° C. The distillate, containing concentrated diacetyl (900 ppm) was then added to a 1% solution of instant coffee at a 0.75 ppm level. This addition resulted in a significant enhancement of coffee flavor by producing a more "buttery" taste in the coffee as judged by an expert panel. The concentrated flavor adjunct was analyzed both organoleptically and analytically via gas chromatography and found to contain diacetyl as the major flavor compound.

EXAMPLE 4

Diacetyl was produced by incubating 2.5 grams of brown extract solids which were dissolved in 250 ml. of water with $Streptococcus$ $lactis$ subspecies diacetylactis (ATCC No. 11007). The incubation mixture contained approximately $10^{10}$ viable cells. These cells were placed in an airtight 500 ml. flask along with the previously-mentioned solution of brown extract solids and the mixture was agitated slowly in a shaker bath at 23° C. The pH of the reaction mixture was 4.8. After a period of 24 hours the mixture contained 7 ppm diacetyl. Even though the flask was airtight, sufficient oxygen for diacetyl production was present in the headspace because the volume of headspace was large compared to the volume of inoculum and nutrient media. Also samples were withdrawn two to three times a day allowing for some aeration. Greater aeration would have increased the yield of diacetyl significantly.

The mixture containing the diacetyl was filtered to remove the bacteria and was then diluted ten fold with fresh brown extract or dissolved instant coffee containing 1% soluble solids. In either case the level of diacetyl in these coffee beverages as-consumed was approximately 0.7 ppm. The coffee beverage containing the diacetyl possessed an enhanced "buttery and winey" flavor.

EXAMPLE 5

Continuous production of diacetyl was attained for 209 hours by immobilizing cells of $L.$ $Casei$ (ATCC No. 393) in a 180 ml stirred reactor. The cells were retained in the reator by an ultrafiltration membrane (Amicon Corp. PM-30) which retain substances with molecular weights greater than 30,000 daltons. A nitrogen pressure of 20 psig was used to maintain a flow rate of 6.8 ml/hour of sterile 20% rich green coffee extract through the reactor. For continuous production of diacetyl at 30 ppm, $10^8$ viable cells/ml were maintained in the reactor, the pH was kept at 4.6–4.8 under nitrogen atmosphere and the temperature at 23° C. This very low level of diacetyl was produced due to the lack of oxygen. Low levels of diacetyl may be produced under anaerobic conditions but such conditions are uneconomical. Higher levels of acetoin are produced under anaerobic conditions.

On distillation of the filtrate, the distillate had the flavor enhancing properties when added to soluble coffee described previously in Example 3.

EXAMPLE 6

This example demonstrates the production of diacetyl by yeast fermentation of an all coffee substrate. $Saccharomyces$ $uvarum$ ($5.5 \times 10^7$ yeast cells per ml.) was innoculated into a 1 liter graduated cylinder containing 1,000 ml of green extract (approximately 10% soluble solids) and allowed to ferment 3 days at room temperature, pH 5.5, without agitation. After 3 days, the yeast cells were centrifuged out of the medium and the spent medium was reinoculated with Candida boidinii ($1 \times 10^8$ yeast cells per ml.) and stirred at room temperature, pH 5.25 at 160 rpm. Diacetyl was detectable at 96 hours at a level of approximately 6 ppm.

EXAMPLE 7

This example demonstrates the production of diacetyl and acetoin utilizing coffee by products, specifically coffee husks, as the source of soluble coffee solids. A long neck culture flask containing fresh coffee husks which were ground and diluted (10% solids, ph 4.9) was inoculated with $10^8$ cells/ml *L. Casei* (ATCC No. 393) and the combination was incubated at 27° C. and stirred at 200 rpm. After fermentation for a 72 hour period the coffee medium was analyzed and was found to contain 327 ppm diacetyl and 245 ppm acetoin.

The above-identified conditions were repeated with the exception that sodium pyruvate was added at a level representing 0.75% by weight of the free acid based upon the total substrate volume at the beginning of the fermentation. After 48 hours 1013 ppm diacetyl and 919 ppm acetoin were produced. At 72 hours 693 ppm diacetyl and 1129 ppm acetoin were produced.

EXAMPLE 8

A screwcap flask containing green coffee extract (10% solids, pH 5.5) was inocculated with $10^8$ cells/ml *L. Casei* (ATCC No. 393) and insulated at 29° C. and stirred at 200 rpm. After 48 hours sodium pyruvate (0.75% by weight of free acid) was added and the fermentation continued. Analysis of the coffee medium after 72 hours of fermentation (24 hours after pyruvate addition) yielded 909 ppm diacetyl and 2281 ppm acetoin. In general, the longer the fermentation progresses after approximately 3 days, the higher the ratio of acetoin to diacetyl in green coffee extract systems.

We claim:

1. A process for producing a natural buttery flavor, winey flavor or combination buttery and winey flavor of which diacetly and acetoin are the major flavor constituents from a coffee substrate which comprises:
    (a) forming a nutrient media containing water and soluble coffee solids as the sole nutrient component, said soluble coffee solids concentration of at least 0.5%;
    (b) adding a diacetyl producing microorganism which is either a strain of lactic acid producing bacteria or yeast to said nutrient media, wherein said microorganism will ferment the coffee solids to produce said natural flavor; and
    (c) mixing the microorganism and nutrient media of step (b) and allowing said microorganism to ferment in the mixture for a period of time effective to produce diacetyl at a pH of from 4.0 to 7.0 and a temperature of from 16° to 37° C. under aeration conditions wherein the nutrient media contains sufficient oxygen to allow for diacetyl production during said fermentation to produce a fermented coffee substrate containing sufficient diacetyl and acetoin to provide said flavor.

2. The process of claim 1 wherein the microorganism is a lactic acid producing bacteria.

3. The process according to claim 1 wherein the nutrient media additionally contains pyruvic acid or salt of pyruvic acid at a level of from 0.1% to 1.0%.

4. The process according to claim 3 wherein the nutrient media contains from 0.5% to 0.8% pyruvic acid.

5. The process of claim 1 wherein the soluble coffee solids is provided by a coffee material selected from the group consisting of green extract, grounds green coffee, coffee by products, hydrolyzed spent ground roast and ground coffee, brown extract, and combinations thereof.

6. The process of claim 1 wherein the substrate composition contains from 0.75% to 25% soluble solids concentration.

7. The process of claim 5 wherein the coffee substrate is green extract.

8. The process of claim 1 wherein the period of time ranges from 8 to 96 hours.

9. The process according to claim 1 wherein the temperature is from 27° to 32° C.

10. The process according to claim 1 further comprising the steps of separating out the diacetyl produced in step (c) and adding the diacetyl to a coffee product or imitation coffee product to enhance a buttery flavor in said product.

11. The process according to claim 10 wherein the level of addition of the diacetyl to the coffee product ranges from 0.1 ppm to 1.5 ppm on an as-consumed basis.

12. The process according to claim 10 wherein the separated diacetyl is added to a soluble coffee product at a level of from 10 to 150 ppm diacetyl on a dry weight basis.

13. The process according to claim 1 further comprising the steps of combining the diacetyl and nutrient media of step (c) with a concentrated coffee extract and spray drying or freeze drying the combination obtained therefrom to produce a soluble coffee.

14. The process according to claim 13 wherein the soluble coffee contains from 10 to 150 ppm diacetyl on a dry weight basis.

15. The process according to claim 1 further comprising the steps of separating out the diacetyl produced in step (c) and combining said diacetyl with a concentrated coffee extract and spray drying or freeze drying the combination obtained therefrom to produce a soluble coffee.

16. The process according to claim 15 wherein the soluble coffee contains from 10 to 150 ppm diacetyl on a dry weight basis.

17. The process according to claim 10 wherein the separated diacetyl is added to roast and ground coffee at a level of from 50 to 400 ppm on a dry weight basis.

18. The product produced by the process of claim 12.

19. A process for producing a natural buttery flavor, winey flavor or combination buttery and winey flavor of which diacetyl and acetoin are the major flavor constituents from a coffee substrate which comprises:
    (a) forming a nutrient media consisting essentially of soluble coffee solids and water containing a soluble coffee solids concentration of at least 0.5%;
    (b) adding a diacetyl producing microorganism which is either a strain of lactic acid producing bacteria or yeast to said nutrient media, wherein said microorganism will ferment the coffee solids to produce said natural flavor; and
    (c) mixing the microorganism and nutrient media of step (b) and allowing said microorganism to ferment in the mixture for a period of time effective to produce diacetyl at a pH of from 4.0 to 7.0 and a temperature of from 16° to 37° C. under aeration conditions wherein the nutrient media contains sufficient oxygen to allow for diacetyl production during said fermentation to produce a fermented coffee substrate containing sufficient diacetyl and acetoin to provide said flavor.

20. The process of claim 19 wherein the microorganism is a lactic acid producing bacteria.

21. The process of claim 19 wherein the soluble coffee solids is provided by a coffee material selected from the group consisting of green extract, ground green coffee, coffee by products, hydrolyzed spent grounds, roast and ground coffee, brown extract, and combinations thereof.

22. The process of claim 21 wherein the substrate composition contains from 0.75% to 25% soluble solids concentration.

23. The process of claim 22 wherein the coffee substrate is green extract.

24. The process of claim 19 wherein the period of time ranges from 8 to 96 hours.

25. The process according to claim 19 wherein the temperature is from 27° to 32° C.

26. The process according to claim 19 wherein the nutrient media additionally contains pyruvic acid or bacteriologically acceptable salt of pyruvic acid at a level of from 0.1% to 1.0%.

27. The process according to claim 26 wherein the nutrient media contains from 0.5% to 0.8% pyruvic acid.

28. The process according to claim 19 further comprising the steps of separating out the diacetyl produced in step (c) and adding the diacetyl to a coffee product or imitation coffee product to enhance a buttery flavor in said product.

29. The process according to claim 28 wherein the level of addition of the diacetyl to the coffee product ranges from 0.1 ppm to 1.5 ppm on an as-consumed basis.

30. The process according to claim 28 wherein the separated diacetyl is added to a soluble coffee product at a level of from 10 to 150 ppm diacetyl on a dry weight basis.

31. The process according to claim 19 further comprising the steps of combining the diacetyl and nutrient media of step (c) with a concentrated coffee extract and spray drying or freeze drying the combination obtained therefrom to produce a soluble coffee.

32. The process according to claim 31 wherein the soluble coffee contains from 10 to 150 ppm diacetyl on a dry weight basis.

33. The process according to claim 19 further comprising the steps of separating out the diacetyl produced in step (c) and combining said diacetyl with a concentrated coffee extract and spray drying or freeze drying the combination obtained therefrom to produce a soluble coffee.

34. The process according to claim 33 wherein the soluble coffee contains from 10 to 150 ppm diacetyl on a dry weight basis.

35. The process according to claim 28 wherein the separated diacetyl is added to roast and ground coffee at a level of from 50 to 400 ppm on a dry weight basis.

36. The product produced by the process of claim 30.

* * * * *